(12) United States Patent
Kerdelhue

(10) Patent No.: US 12,187,149 B2
(45) Date of Patent: Jan. 7, 2025

(54) RAPID CHARGING DEVICE FOR A MOTOR VEHICLE

(71) Applicant: NW Joules, Paris (FR)

(72) Inventor: Jean-Christophe Kerdelhue, Paris (FR)

(73) Assignee: NW Joules, Paris (FR)

( * ) Notice: Subject to any disclaimer, the term of this patent is extended or adjusted under 35 U.S.C. 154(b) by 194 days.

(21) Appl. No.: 17/435,252

(22) PCT Filed: Sep. 17, 2020

(86) PCT No.: PCT/EP2020/076060
§ 371 (c)(1),
(2) Date: Aug. 31, 2021

(87) PCT Pub. No.: WO2021/069189
PCT Pub. Date: Apr. 15, 2021

(65) Prior Publication Data
US 2022/0234464 A1     Jul. 28, 2022

(30) Foreign Application Priority Data

Oct. 11, 2019  (FR) ........................................ 1911314

(51) Int. Cl.
*B60L 53/63* (2019.01)
*B60L 55/00* (2019.01)
(Continued)

(52) U.S. Cl.
CPC ............... *B60L 53/63* (2019.02); *B60L 55/00* (2019.02); *H02J 3/32* (2013.01); *H02J 7/00712* (2020.01); *H02M 5/12* (2013.01)

(58) Field of Classification Search
CPC ..................................................... B60L 53/63
(Continued)

(56) References Cited

U.S. PATENT DOCUMENTS 10,424,945 B2   9/2019  Yoo
2014/0097693 A1  4/2014  Leu
(Continued)

FOREIGN PATENT DOCUMENTS

DE    3813868 A1   12/1988
EP    1372239 A1   12/2003
(Continued)

OTHER PUBLICATIONS

International Search Report issued in PCT Patent Application No. PCT/EP2020/076060 mailed on Dec. 8, 2020.

*Primary Examiner* — Edward Tso
*Assistant Examiner* — Ahmed H Omar
(74) *Attorney, Agent, or Firm* — MARSHALL, GERSTEIN & BORUN LLP

(57) ABSTRACT

The disclosure relates to a balancing system for a network. The system includes a network input for detecting balancing requirements, and a transformer that includes a first winding connected to the output of the network input. The system also includes an inverter connected to a second winding of the transformer, a set of batteries connected to the inverter, and a supervision unit configured to activate the inverter and to charge or discharge the batteries when an imbalance is measured on said network. The system further includes an additional inverter connected to a third winding of the transformer, the output of which is used to supply power to at least one charging socket of an electric vehicle. The supervision unit is configured to activate the additional inverter when a charging requirement is detected at the charging socket and the requirements for injection into the network are less than a threshold value.

9 Claims, 6 Drawing Sheets

(51) Int. Cl.
  *H02J 3/32*      (2006.01)
  *H02J 7/00*      (2006.01)
  *H02M 5/12*      (2006.01)

(58) Field of Classification Search
  USPC ........................................................ 320/104
  See application file for complete search history.

(56) References Cited

U.S. PATENT DOCUMENTS

| | | | |
|---|---|---|---|
| 2017/0008413 A1* | 1/2017 | Reineccius | H02J 3/381 |
| 2018/0031641 A1* | 2/2018 | Drees | H01M 10/486 |
| 2019/0039707 A1* | 2/2019 | Ezaki | B63J 99/00 |
| 2019/0280492 A1* | 9/2019 | Haj-Maharsi | H02J 9/062 |
| 2020/0193345 A1* | 6/2020 | Elbsat | G06Q 10/06315 |

FOREIGN PATENT DOCUMENTS

| | | | |
|---|---|---|---|
| JP | H10174450 A | 6/1998 | |
| JP | 2020022311 A | 2/2020 | |

\* cited by examiner

[Fig. 1]
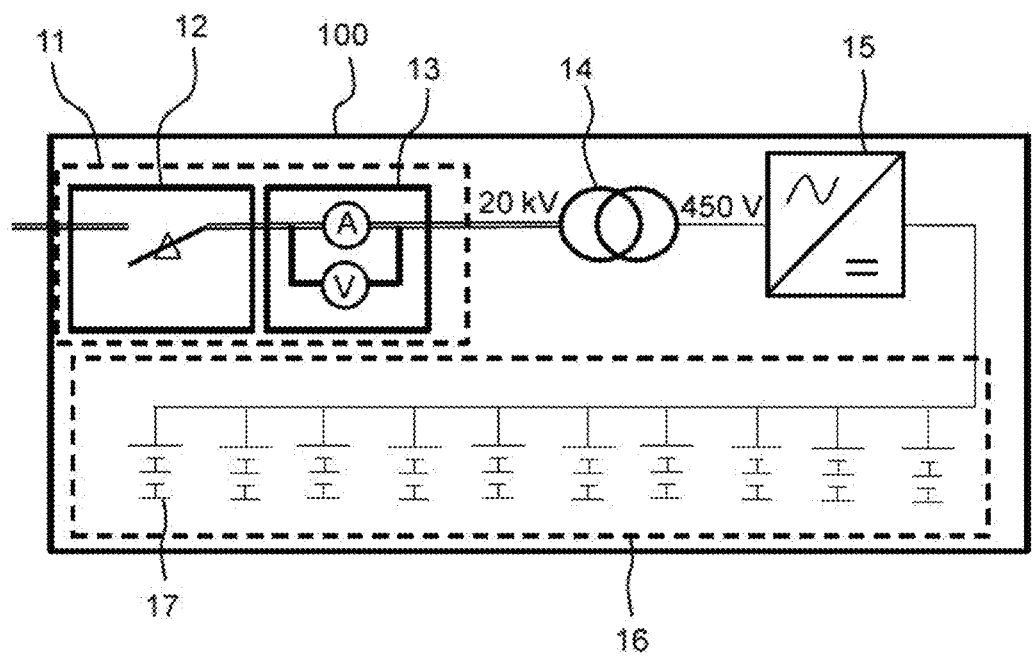
State of the art

[Fig. 2]
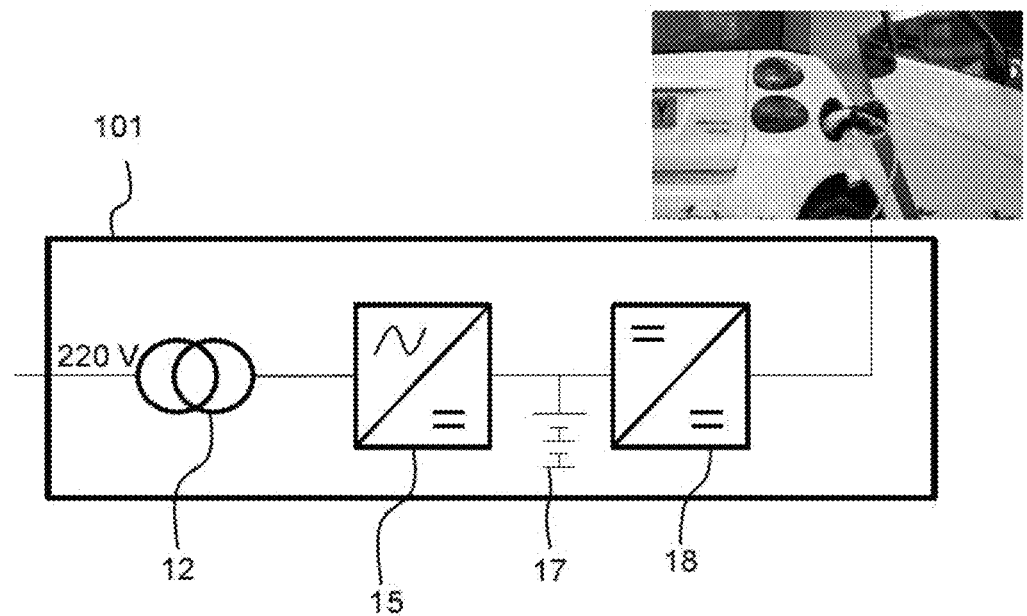
State of the art

[Fig. 3]
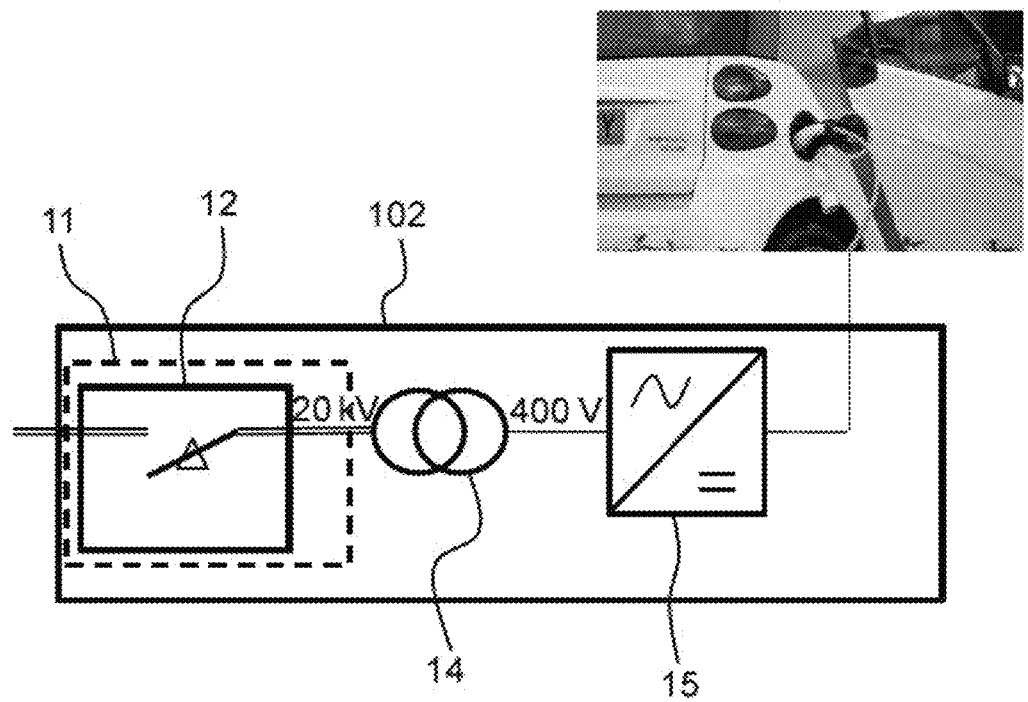
State of the art

[Fig. 4]
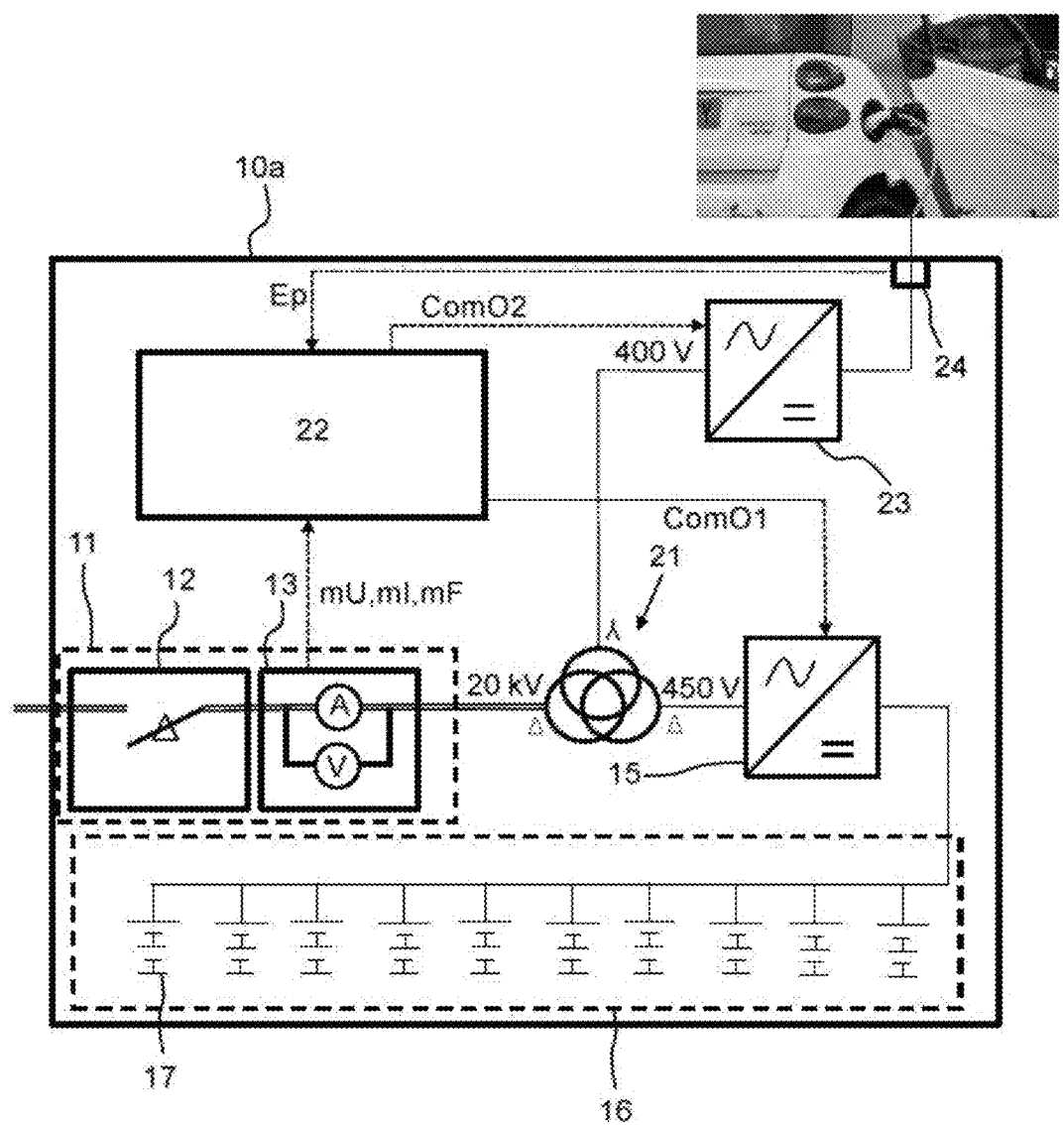

[Fig. 5]
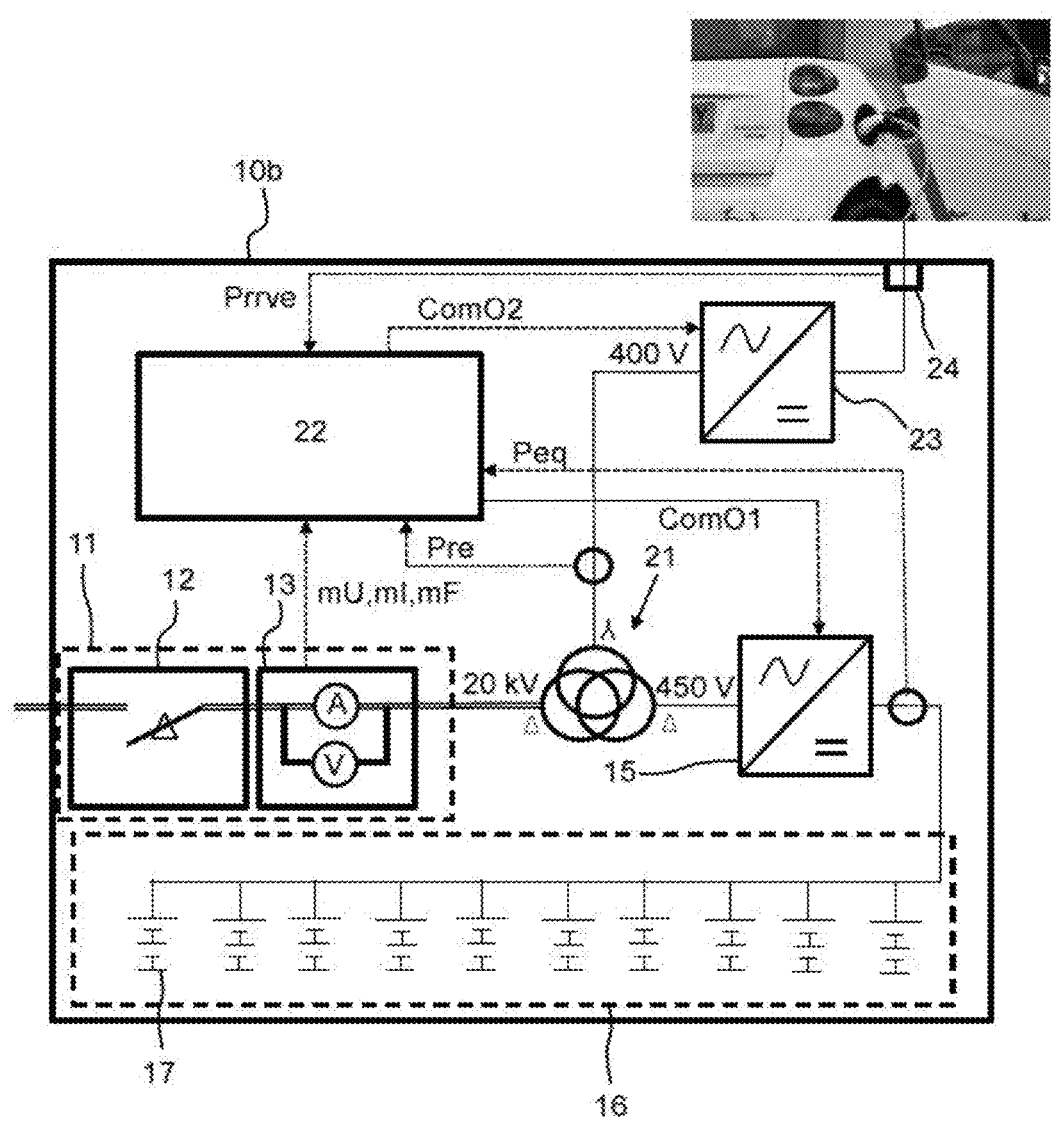

[Fig. 6]
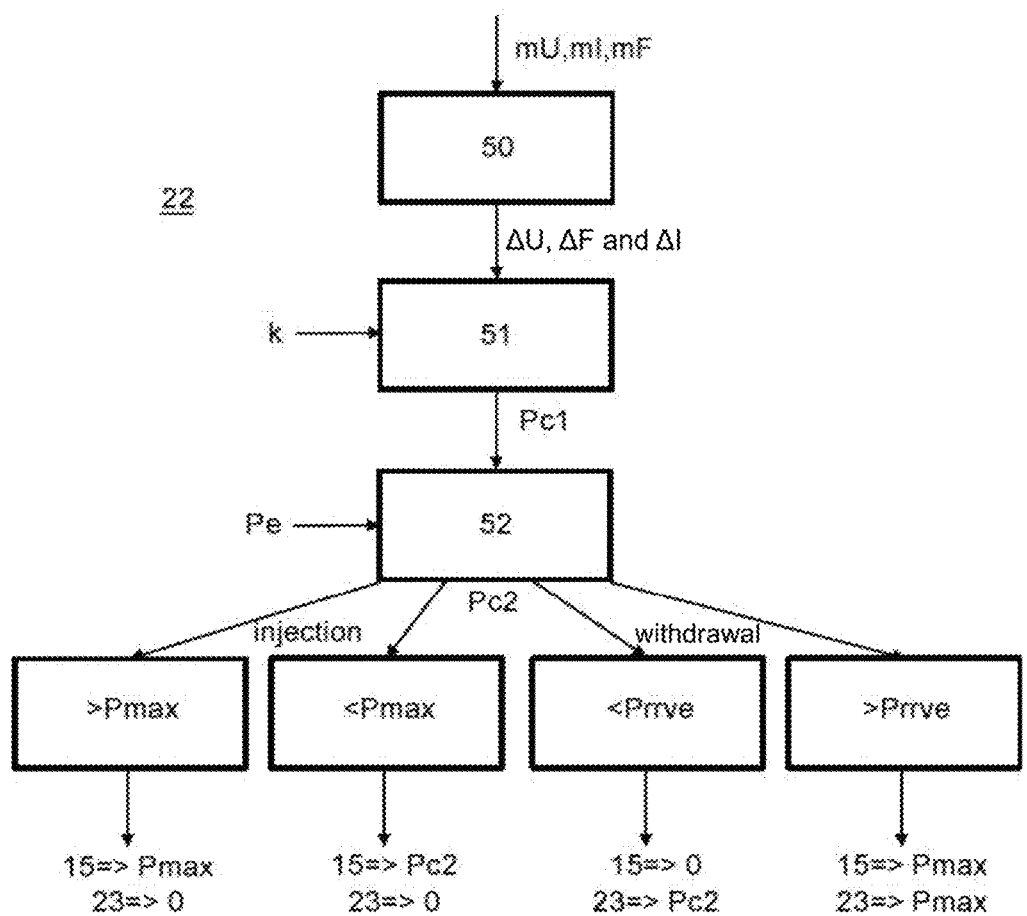

RAPID CHARGING DEVICE FOR A MOTOR VEHICLE

TECHNICAL FIELD

The present disclosure relates to the field of charging devices for motor vehicles, such as an electric or hybrid car or bus. These charging devices are also called "charging stations" and can be installed in a variety of locations, such as private parking lots, public parking lots of stores or restaurants for example.

The disclosure relates more specifically to a so-called "rapid" charging station.

BACKGROUND

The development of electric or hybrid vehicles is naturally accompanied by the development of charging solutions for these vehicles. One of the points blocking growth in the use of full-electric vehicles is the charging time of these vehicles. In fact, this charging time is much longer than that required to refuel a combustion vehicle. For example, when traveling long distances, a driver is more likely to use a combustion or hybrid vehicle than a full-electric vehicle.

An electric (or hybrid) vehicle is charged by charging one or more batteries connected to the vehicle's electrical network. To do this, the electrical energy is typically consumed over an electrical network with AC voltage. The function of the charging station is to transform the AC voltage from the network to a voltage level suitable for the battery and to transform the AC voltage into a DC voltage.

A conventional charging station is connected to an electrical network operating at 220 V AC and comprises a network input connected to a transformer lowering the AC voltage to a level of about 50 V linked to an AC/DC converter connected to a charging socket of the electric vehicle.

With this type of widely available charging station, fully charging an electric vehicle typically takes 8 to 12 hours.

However, withdrawal by several charging stations on a network can lead to degraded network performance. Indeed, in an electrical network, consumption must always be balanced with generation at the risk of varying the characteristics of the network, particularly its frequency. To do this, the network operator can use primary, secondary and tertiary reserves, which operate on different time and power scales. For example, the primary reserve has an action time of less than 30 seconds, the secondary reserve has an action time of less than 15 minutes, and the tertiary reserve has an action time of 30 minutes.

Thus, when an imbalance is detected, the primary reserves are automatically activated based upon the frequency differences measured between the network and a reference signal produced by the operator of the transmission network. Indeed, when an imbalance occurs between generation and consumption, the network frequency deviates from the required level of 50 Hz and this deviation activates the primary reserve of the entities participating in this primary reserve. Each of these entities must increase its injection power if the frequency is less than 50 Hz or decrease its injection power or even withdraw current, if the frequency is greater than 50 Hz. A new balance point between generation and consumption is thus obtained on the network.

To obtain the necessary responsiveness, the primary reserve comprises reserve entities connected to the high-voltage network or medium-voltage network. In fact, an electrical power transmission network is typically structured with several voltage levels, for example high-voltage lines transport the current with a voltage between 50 kV and 400 kV, medium-voltage lines with a voltage between 1 kV and 50 kV and low-voltage lines with a voltage of 220 V. These lines are interconnected with transformer stations located between the different types of lines.

A system using batteries to participate as a reserve entity in the primary reserve typically includes a set of very high capacity batteries charged to half their capacity in order to inject or withdraw power from the network as required. Similarly, this system participates in voltage regulation according to the specifications of the network operator, by injecting or withdrawing reactive power.

The primary reserve must be proportioned to inject or release a significant portion of the network's generation and consumption. In Europe, all the reserve entities that form the primary reserve represent a capacity of 3000 MW, i.e. the generation power of the two largest nuclear reactors in service. To obtain this total power, each reserve entity must be proportioned to have a capacity of at least 1 MW.

More precisely, as shown in FIG. 1, a balancing system 100 with batteries 17 comprises a network input 11 incorporating high-voltage or medium-voltage network protection units 12 and units for measuring 13 network performance in order to detect power and voltage balancing requirements. This network input is connected to a step-down transformer 14. For example, when the balancing system is connected to the medium-voltage network, the transformer can be configured to transform a 20 kV AC voltage into a 450 V AC voltage. The output of the transformer 14 is connected to an inverter 15 configured to convert the AC voltage into a DC voltage supplying a network 16 of batteries 17. A supervision unit, not shown, measures the active and reactive power of the network over time and controls the charging or discharging of the batteries 17 in order to compensate for network imbalances.

In order to limit the contract power for connecting the system to the network, charging stations 101 for electric vehicles incorporating one or more batteries are also known, as shown in FIG. 2. This type of charging station 101 incorporates a transformer 12 lowering the AC voltage of the low-voltage network followed by an AC/DC converter 15 connected to a battery 17 and configured to adapt the voltage level to the battery 17.

The output of the AC/DC converter 15 is also connected to a second DC/DC converter 18 connected to a charging socket of the electric vehicle and configured to adapt the voltage level to the electric vehicle. When the power demand exceeds a threshold value, the battery 17 is used to limit the strain that would be imposed on the network.

In addition, the battery 17 can be charged after the charging phase of an electric vehicle. Although this embodiment limits the instantaneous power withdrawn from the network, the charging time is not improved with respect to a conventional charging station.

To improve the charging speed, it is possible to use a charging station connected directly to the high-voltage network or to the medium-voltage network in order to supply maximum power to the electric vehicle. As shown in FIG. 3, this type of charging station 102 incorporates a network input 11 incorporating high-voltage or medium-voltage network protection units 12 and a step-down transformer 14.

The output of the transformer 14 is connected to an inverter 15 configured to convert the AC voltage into a DC voltage supplying the charging socket of the electric vehicle. With this type of charging station, an electric vehicle can be charged in 20 minutes.

Although this solution is effective for improving the charging speed of an electric vehicle, the size and cost of the protection units 12 needed in order to be authorized to connect to the high-voltage or medium-voltage network are prohibitive for the deployment of this type of charging station.

The technical problem solved by the disclosed embodiments is therefore that of how to obtain a rapid charging station that overcomes the disadvantages of the previously disclosed devices.

SUMMARY OF THE DISCLOSURE

To address this technical problem, the disclosed embodiments propose modifying a balancing system forming part of the primary or secondary reserve so as to perform, in addition to the network balancing function, a charging function for an electric or hybrid vehicle. Thus, the protection units needed in order to be authorized to connect to the high-voltage or medium-voltage network are common to the balancing system and the charging station, and this limits the number of components required for the installation of the charging station.

To do this, the transformer is modified with a dedicated additional winding to supply power to the charging socket of the electric vehicle via a dedicated inverter.

For this purpose, according to a first aspect, the disclosed embodiments relate to a balancing system for a high-voltage or medium-voltage network comprising:
- a network input incorporating protection units for protecting said network and units for measuring the performance of said network in order to detect the balancing requirements;
- a transformer having a first winding connected to the output of said network input and configured to lower the voltage of said network;
- an inverter connected to a second winding of said transformer and configured to transform an AC voltage into a DC voltage;
- a set of batteries connected to said DC voltage; and
- a supervision unit configured to activate said inverter and to charge or discharge said batteries when an imbalance is measured on said network by said measurement units.

The disclosed embodiments are characterized in that said balancing system also comprises an additional inverter connected to a third winding of said transformer, the output of which makes it possible to supply power to at least one charging socket of an electric or hybrid vehicle; and means for detecting a charging requirement of said charging socket; said supervision unit being configured to activate said additional inverter when a charging requirement is detected at said charging socket and the requirements for injection into the network are less than a threshold value.

Thus, the disclosed embodiments propose the use of a balancing system to charge an electric or hybrid vehicle except in the phases in which a large amount of power needs to be injected into the network. Indeed, in a balancing system, the injection and withdrawal phases are normally relatively short, often a few tens of seconds. Compared to the charging time of an electric or hybrid vehicle, these withdrawal or injection instants are very short.

Unlike a conventional charging station, the disclosed charging station is much faster, since it is connected to the high-voltage or medium-voltage network. Thus, although it is not available all the time, since the charging station cannot be used when the balancing system needs to inject a large amount of power into the network, the improvement of the charging speed during the other phases largely compensates for the instants during which the charging station cannot be used to charge an electric or hybrid vehicle.

Moreover, compared with a rapid charging station of the state of the art, the installation cost of the charging station is lower since the protection units needed in order to be authorized to connect to the high-voltage or medium-voltage network are common to the balancing system and the charging station, and this limits the number of components necessary for the installation of the charging station.

The disclosed embodiments are therefore the result of a discovery whereby the unavailability of the charging station at the instants of high injection of a balancing system is compensated by the gain in charging speed and does not significantly degrade the lifespan of batteries integrated in electric or hybrid vehicles.

Indeed, it is known that interruptions in the charging phases degrade the lifespan of batteries integrated in electric or hybrid vehicles. However, a substantially constant lifespan has been measured for lithium-ion batteries integrated in electric or hybrid vehicles, even when using a charging station according to the disclosed embodiments, i.e. with unavailability instants that may occur during the charging phases.

According to one embodiment, said units for measuring the performance of said network in order to detect the balancing requirements comprise a dedicated energy meter for the operator of said network and an independent energy meter. The dedicated meter for the network operator typically makes it possible, in a balancing system, to allow the network operator to check that the balancing system is active according to the contract imposed by the network operator. For example, the network operator may have imposed a constraint that the balancing system must withdraw 10% of active power when the frequency exceeds a threshold value or any other network prevention mode and, similarly, withdraw 10% of reactive power when the voltage exceeds a threshold value or any other network prevention mode. The independent meter makes it possible to check the fulfillment of the contract by the provider. Additionally, the independent meter can be used to measure the power withdrawn from the network to supply power to the charging station and not to balance the network.

According to one embodiment, said transformer is delta-wired at the first winding, delta-wired at the second winding and star-wired at the third winding. This embodiment makes it possible to obtain maximum power at the set of batteries via a delta/delta coupling that does not allow the neutral to be transmitted. Conversely, for the charging station, it may be necessary to have access to the neutral and the delta/star coupling makes it possible to transmit the neutral without degrading the delta/delta coupling that supplies the set of batteries.

To implement the disclosed embodiments, it is necessary to configure the supervision unit to allow injection into and withdrawal from the network while using the same network to supply power to the second inverter in the phases for which maximum injection is not required. The easiest way to do this is to allow the second inverter to operate when the charging socket is in use and maximum injection into the network is not required.

In this embodiment, said means for detecting a charging requirement of said charging socket correspond to a probe configured to detect a consumption at said charging socket.

Alternatively, the control of the two inverters can depend on both the balancing requirements of the network and the withdrawal requirements of the charging station. Thus, a compromise can be sought between these two requirements when the requirements for injection into the network are not maximal.

In this embodiment, said means for detecting a charging requirement of said charging socket correspond to a probe for measuring the requested charging power at said charging socket.

Additionally, in this embodiment, said balancing system preferably comprises a probe disposed between said transformer and said additional inverter so as to measure an instantaneous power consumed by said charging socket. Similarly, said balancing system preferably comprises a probe disposed between said inverter and said set of batteries so as to measure an instantaneous power consumed by said charging socket.

With these two probes, the supervision unit is able to detect the power used on each output of the transformer to balance the withdrawal from the network based upon the withdrawal requirements in order to supply power to the charging socket and to maintain the set of batteries at the balance point corresponding approximately to half of the total capacity of each of the batteries.

For this purpose, according to a second aspect, the embodiments relate to a method for managing a balancing system according to the first aspect, said method comprising the following steps:

measuring the difference between a voltage measurement, a frequency measurement and a current measurement of the network and the nominal values in order to determine the active and/or reactive power injection and/or withdrawal requirements;

determining a control power of the inverter connected to the set of batteries based upon the injection and/or withdrawal requirements;

if the injection requirements are greater than a maximum injection power, deactivating the additional inverter and activating the inverter connected to the set of batteries in order to inject said maximum injection power, if the injection requirements are less than a maximum injection power, deactivating the additional inverter and activating the inverter connected to the set of batteries in order to inject said control power, if the withdrawal requirements are less than a requested charging power at said charging socket and the charge level of the set of batteries is greater than a threshold value, deactivating the inverter connected to the set of batteries and activating the additional inverter in order to withdraw said control power, and if the withdrawal requirements are greater than a requested charging power at said charging socket and the charge level of the set of batteries is less than a threshold value, activating the two inverters until the charge level of the set of batteries is greater than said threshold value.

Preferably, said control power is determined based upon load losses estimated from measurements taken from two probes respectively disposed between said transformer and said additional inverter and between said inverter and said set of batteries.

BRIEF DESCRIPTION OF THE FIGURES

The way of implementing the embodiments and the advantages resulting therefrom shall be apparent from the following embodiments, given as non-limiting examples, in support of FIGS. 1 to 6, which constitute:

FIG. 1 is a schematic depiction of a balancing system with batteries of the state of the art;

FIG. 2 is a schematic depiction of a charging station with batteries of the state of the art;

FIG. 3 is a schematic depiction of a "rapid" charging station of the state of the art;

FIG. 4 is a schematic depiction of a balancing system according to a first embodiment;

FIG. 5 is a schematic depiction of a balancing system according to a second embodiment; and FIG. 6 is a flowchart of the management steps of a supervision unit of the balancing system of FIG. 4.

DETAILED DESCRIPTION

FIG. 4 shows a balancing system 10a which also forms a charging station for an electric or hybrid vehicle. This balancing system 10a typically comprises a network input 11 incorporating protection units 12 and measurement units 13. The network input 11 can be connected to the high-voltage or medium-voltage network. For example, the network input 11 may be connected to two separate power cables each carrying a voltage of 20 kV. Additionally, the network input 11 may also include a network outlet allowing one of the two cables to pass through the network input 11 so as to form a balancing system through which the network passes.

The protection units 12 typically correspond to high-voltage or medium-voltage circuit-breakers, for example controlled circuit-breakers capable of disconnecting a current of 400 A in order to protect the balancing system 10a. Preferably, the network cables enter the network input 11 via manual circuit-breakers allowing maintenance operations to be performed in the balancing system 10a. An automatic circuit-breaker is preferably installed at the output of these manual circuit-breakers so as to cut off the current flowing through the network input 11 when the inrush currents inside the balancing system 10a are greater than a threshold value. Thus, these protection units 12 are preferably coupled with measurement units 13 in order to detect the instants at which it is necessary to cut off the current flowing through the network input 11.

These measurement units 13 also have the function of measuring the frequency, the voltage and the phase shift between the current and this voltage, in order to detect the active and reactive power balancing requirements of the network. Preferably, these measurement units 13 incorporate several energy meters: one energy meter associated with the network operator and one independent energy meter associated with the operator of the balancing system 10a. These energy meters are preferably connected to a wired or wireless communication network.

Thus, the network operator can obtain information about the balancing requirements in real time using the measurements taken by the measurement units 13 of the balancing system 10a. Similarly, the measurements taken by the independent energy meter can be transmitted to the operator of the balancing system 10a to control the amount of energy injected into or withdrawn from the network.

The measurement units 13 transmit at least three pieces of information to a supervision unit 22: a voltage measurement mU, a frequency measurement mF and a current measurement ml, the supervision unit 22 being configured to calculate the phase shift between the current and the voltage. Alternatively, the measurement units 13 may comprise means for automatically detecting the phase shift between the voltage and the current and this phase shift may be transmitted to the supervision unit 22.

The primary function of the supervision unit 22 is to identify the network balancing requirements ΔU, ΔF, and ΔI and to fulfill these requirements based on the state of charge of the batteries 17 integrated in the balancing system 10a. This supervision unit 22 can be in the form of a microcontroller or a microprocessor associated with a sequence of instructions. In addition, this supervision unit 22 can be remotely controlled, for example by the operator of the balancing system 10a in order to update the balancing strategies or the authorizations to charge the electric or hybrid vehicles.

In order to perform the balancing or charge of an electric or hybrid vehicle, the output of the network input 11 is connected to a transformer 21 comprising three windings. The first winding is preferably delta-wired and receives the 20 kV voltage from the network. This first winding is coupled to a second winding preferably also delta-wired with a voltage lowered to 450 V.

This lowered AC voltage is connected to an inverter 15, which makes it possible to transform this AC voltage into a DC voltage that supplies the set 16 of batteries 17. Preferably, the output of the inverter 15 has a DC voltage level between 700 and 1000 volts.

The transformer 21 also has a third winding that is preferably star-connected is linked to an additional inverter 23. This additional inverter receives a voltage lowered to 400 V and transforms this AC voltage into a DC voltage suitable for charging a motor vehicle, for example 50 V. Thus, the output of the additional inverter 23 is connected to a charging socket of an electric or hybrid vehicle 24. Of course, the voltage levels at the network input 11, transformer 21 and inverters 15, 23 can vary without deviating from the contemplated embodiments.

In addition to these features which are essential to the embodiment described, other features may be implemented to improve the safety or the control strategies of the balancing system 10a. For example, FIG. 5 shows probes disposed after the transformer 21 in order to measure power at various points in the balancing system 10b. More precisely, a probe is disposed at the output of the inverter 15 in order to measure the power at the set of batteries Peq, i.e. after the losses associated with the transformer 21 and the inverter 15, and a probe is disposed between the third winding of the transformer 21 and the additional inverter 23 in order to measure the power consumed Pre by the charging socket 24.

To adapt the balancing strategy of the two inverters 15 and 23, it suffices to detect a consumption or, at the very least, a presence on the charging socket 24 by means of a signal Ep, as shown in FIG. 4. Preferably, as shown in FIG. 5, the charging power requested Prrve by the charging socket 24 is measured by a probe disposed at the charging socket 24 in order to provide information to the supervision unit 22.

Based on these various pieces of information transmitted to the supervision unit 22, the supervision unit 22 can determine the strategy to be followed by the inverters 15 and 23.

In addition to these structural features that make it possible to charge an electric or hybrid vehicle and to balance the network, the balancing system 10a-10b can incorporate conventional features of a balancing system, such as a cooling unit making it possible to cool the transformer 21 or the set of batteries 17, an alarm, a fire protection unit, etc.

FIG. 6 shows an example of a method for managing the two inverters 15 and 23 implemented by the supervision unit 22. In a first step 50, this method measures the difference between the voltage mU, frequency mF, and current ml and nominal values to detect the reactive and/or active power injection or withdrawal requirements ΔU, ΔI, ΔF of the network. Thus, when the difference between a nominal value and a measured value mU, mF, ml exceeds a threshold value, an injection or withdrawal requirement is determined based upon this difference. The second step 51 aims to determine the power to be applied to the inverter 15 based upon the injection or withdrawal requirements Pc1 and a coefficient k. These requirements Pc1 are then specified in a second determination step 52 by taking into account the real losses at the transformer 21. These real losses can be estimated by the different probes based upon the state of the inverters 15 and 23.

The requirements Pc2 obtained from step 52 can be applied based upon several predefined scenarios, for example:
- if the injection requirements ΔU, ΔF, ΔI are greater than a maximum injection power Pmax, deactivating the additional inverter 23 and activating the inverter 15 connected to the set of batteries 17 in order to inject the maximum injection power Pmax,
- if the injection requirements ΔU, ΔF, ΔI are less than a maximum injection power Pmax, deactivating the additional inverter 23 and activating the inverter 15 connected to the set of batteries 17 in order to inject the control power Pc1 or Pc2,
- if the withdrawal requirements ΔU, ΔF, ΔI are less than a requested charging power Prrve at the charging socket 24 and the charge level of the set of batteries 17 is greater than a threshold value, deactivating the inverter 15 connected to the set of batteries 17 and activating the additional inverter 23 in order to withdraw the control power Pc1 or Pc2, and
- if the withdrawal requirements ΔU, ΔF, ΔI are greater than a requested charging power Prrve at the charging socket 24 and the charge level of the set of batteries 17 is less than a threshold value, activating both inverters 15, 23 until the charge level of the set of batteries 17 is greater than the threshold value.

The disclosed embodiments thus make it possible to obtain a balancing system 10a-10b which makes it possible, in addition to balancing the network, to charge an electric or hybrid vehicle very rapidly since the balancing system is connected directly to the high-voltage or medium-voltage network. The disclosed embodiments thus make it possible to obtain a "rapid" charging station that is less expensive since it reuses existing components in the balancing system 10a-10b, particularly at the network input 11.

The invention claimed is:

1. A balancing system of a high-voltage or medium-voltage network comprising:
    a network input incorporating protection units for protecting said network and units for measuring the performance of said network in order to detect the balancing requirements;
    a transformer having a first winding connected to the output of said network input and configured to lower the voltage of said network;
    an inverter connected to a second winding of said transformer and configured to transform an AC voltage into a DC voltage;
    a set of batteries connected to said DC voltage; and a supervision unit configured to activate said inverter and to charge or discharge said batteries when an imbalance is measured on said network by said measurement units;

wherein said balancing system also includes an additional inverter connected to a third winding of said transformer, the output of which makes possible the supply of power to at least one charging socket of an electric or hybrid vehicle; and means for detecting a charging requirement of said charging socket;

said supervision unit being configured to activate said additional inverter when a charging requirement is detected at said charging socket and the requirements for injection into the network are less than a threshold value.

2. The balancing system according to claim 1, wherein said units for measuring the performance of said network in order to detect the balancing requirements comprise a dedicated energy meter for the operator of said network and an independent energy meter.

3. The balancing system according to claim 1, wherein said transformer is delta-wired at the first winding, delta-wired at the second winding and star-wired at the third winding.

4. The balancing system according to claim 1, wherein said means for detecting a charging requirement of said charging socket correspond to a probe configured to detect a consumption at said charging socket.

5. The balancing system according to claim 1, wherein said means for detecting a charging requirement of said charging socket correspond to a probe for measuring the requested charging power at said charging socket.

6. The balancing system according to claim 1, wherein said balancing system comprises a probe disposed between said transformer and said additional inverter so as to measure an instantaneous power consumed by said charging socket.

7. The balancing system according to claim 1, wherein said balancing system comprises a probe disposed between said inverter and said set of batteries so as to measure an instantaneous power consumed by said charging socket.

8. A method for managing a balancing system according to claim 1, said method comprising the following steps:

measuring the difference between a voltage measurement, a frequency measurement and a current measurement of the network and nominal values in order to determine the injection and/or withdrawal requirements;

determining a control power of the inverter connected to the set of batteries based upon the active and/or reactive power injection and/or withdrawal requirements;

if the injection requirements are greater than a maximum injection power, deactivating the additional inverter and activating the inverter connected to the set of batteries in order to inject said maximum injection power, if the injection requirements are less than a maximum injection power, deactivating the additional inverter and activating the inverter connected to the set of batteries in order to inject said control power, if the withdrawal requirements are less than a requested charging power at said charging socket and the charge level of the set of batteries is greater than a threshold value, deactivating the inverter connected to the set of batteries and activating the additional inverter in order to withdraw said control power, and if the withdrawal requirements are greater than a requested charging power at said charging socket and the charge level of the set of batteries is less than a threshold value, activating the two inverters until the charge level of the set of batteries is greater than said threshold value.

9. The management method according to claim 8, wherein said control power is determined based upon load losses estimated from measurements taken from two probes respectively disposed between said transformer and said additional inverter and between said inverter and said set of batteries.

* * * * *